United States Patent [19]

Breeden

[11] Patent Number: 5,327,480
[45] Date of Patent: Jul. 5, 1994

[54] METHOD AND APPARATUS IN A COMMUNICATION SYSTEM FOR COMPLETING AN INBOUND CALL

[75] Inventor: Robert L. Breeden, Boca Raton, Fla.

[73] Assignee: Motorola, Inc., Schaumburg, Ill.

[21] Appl. No.: 20,921

[22] Filed: Feb. 22, 1993

[51] Int. Cl.$^5$ .......................................... H04M 11/00
[52] U.S. Cl. ........................................ 379/57; 379/58; 379/59
[58] Field of Search ........................... 379/57–59, 379/61, 63; 340/311.1

[56] References Cited

U.S. PATENT DOCUMENTS

| | | | |
|---|---|---|---|
| 5,099,507 | 3/1992 | Mukai et al. | 379/57 |
| 5,117,449 | 5/1992 | Metroka et al. | 379/63 |
| 5,148,473 | 9/1992 | Freeland et al. | 379/58 |
| 5,153,902 | 10/1992 | Buhl et al. | 379/57 |
| 5,202,912 | 4/1993 | Breeden et al. | 379/58 |

OTHER PUBLICATIONS

World Publication, WO 91/12673, "Radio Telephone With Detachable Selective Call Receiver" Aug. 1991.
World Publication, WO 91/14349, "Dynamic Allocation of Roamer Routing Numbers System And Method", Sep. 1991.

*Primary Examiner*—Curtis Kuntz
*Assistant Examiner*—Dwayne D. Bost
*Attorney, Agent, or Firm*—R. Louis Breeden; Thomas G. Berry

[57] ABSTRACT

A method and apparatus for completing an inbound call from a telephone system to a portable communication unit (104) operating in a communication system comprising a base station (102) coupled to the telephone system (106, 124). The telephone system (106, 124) can complete the inbound call by different procedures requiring differing responses. The portable (104) receives (502) a selective call message (400) comprising a Call-Type Identifier (402) and a Call-Completion Number (412, 414, 416), and then transmits (520, 522, 524) to the base (102) the Call-Completion Number (412, 414, 416) and a Call-Type Code corresponding to the received Call-Type Identifier (402). The base (102) originates (606, 624) a call to the telephone system (106, 124) in accordance with the Call-Completion Number (412, 414, 416) and the Call-Type Code, and then completes the inbound call according to the Call-Type Code.

20 Claims, 5 Drawing Sheets

| | | |
|---|---|---|
| 402 | CALL TYPE (1 = MEET-ME; 2 = CALL-FWD.) | NON-DISPLAYED |
| 404 | TIME-OUT MOST SIGNIFICANT DIGIT | NON-DISPLAYED |
| 406 | TIME-OUT LEAST SIGNIFICANT DIGIT | NON-DISPLAYED |
| 408 | CALL-COMPLETION DIGIT COUNT MSD | NON-DISPLAYED |
| 410 | CALL-COMPLETION DIGIT COUNT LSD | NON-DISPLAYED |
| 412 | CALL-COMPLETION DIGIT 1 | NON-DISPLAYED |
| 414 | CALL-COMPLETION DIGIT 2 | NON-DISPLAYED |
| 416 | CALL-COMPLETION DIGIT N | NON-DISPLAYED |
| 418 | ADDITIONAL NUMBER DIGIT 1 | DISPLAYED |
| 420 | ADDITIONAL NUMBER DIGIT 2 | DISPLAYED |
| 422 | ADDITIONAL NUMBER DIGIT M | DISPLAYED |

METHOD AND APPARATUS IN A COMMUNICATION SYSTEM FOR COMPLETING AN INBOUND CALL

FIELD OF THE INVENTION

This invention relates in general to radio communication systems, and more specifically to a radio communication system for completing an inbound call from a telephone system to a portable communication unit.

BACKGROUND OF THE INVENTION

Two-way wireless communication systems that support inbound calling from a telephone system are well known. Examples of such systems include cellular telephone systems and trunked radio systems. Simpler, less expensive two-way wireless communication systems have recently become available. One such system is the "CT2" system comprising, for example, the S35XGB1602AP base station and the S35XCD1000AA portable communication unit, both manufactured by Motorola, Inc. of Schaumburg, Ill. The CT2 system typically has included a plurality of base stations at a plurality of locations called "telepoints." Each telepoint usually had from two to six base station transceivers, and each transceiver was coupled to the telephone system by a telephone line. Unfortunately, conventional telepoint systems initially did not provide inbound call capability. That is, a telepoint user could originate a call to any destination reachable by the telephone system, but could not receive any inbound calls.

Several different procedures for providing inbound calling have been proposed. One example procedure (defined herein as the "Meet-Me" procedure) uses a telephone switch coupled to a paging system to send a Meet-Me telephone number to a radio pager coupled to the portable communication unit. The Meet-Me telephone number when dialed by the portable communication unit through a base station reaches a port of the telephone switch, where a waiting inbound call is then connected to the portable communication unit. Another example procedure (defined herein as the "Call Forwarding" procedure) uses a telephone switch coupled to a paging system to send a call identification number to a radio pager coupled to the portable communication unit. The portable communication unit sends the call identification number to a base station, which sends the telephone switch a predetermined "feature code" followed by the call identification number. The telephone switch then forwards by a call-back to the base station a waiting inbound call identified by the call identification number.

The two procedures for inbound calling described above require the portable communication unit and the base station to respond in two different manners to process the call. This implies that a base station and a portable communication unit compatible with one of the procedures are different from a base station and a portable communication unit compatible with the other procedure. Additional procedures requiring additional differing responses are likely to be proposed in the future, requiring additional unique varieties of base stations and portable communication units. Still, for economic and administrative reasons it is highly desirable that a single base station configuration and a single portable communication unit configuration be compatible with at least several of the most prevalent procedures for inbound calling without requiring alteration of the base station or the portable communication unit.

Thus, what is needed is a method and apparatus for overcoming the need for unique construction of the base station and the portable communication unit for compatibility with different inbound calling procedures. Preferably, the method and apparatus should be readily adaptable to modifications and additions for accommodating new inbound calling procedures that may be developed in the future.

SUMMARY OF THE INVENTION

One aspect of the present invention comprises a method for completing an inbound call from a telephone system to a user of a portable communication unit including a memory and user controls operating in a communication system comprising a base station coupled to the telephone system by a telephone line. The telephone system is capable of completing the inbound call by a plurality of procedures requiring a plurality of differing responses by the base station and the portable communication unit. The method comprises in the portable communication unit the steps of receiving a selective call message comprising a Call-Type Identifier and a Call-Completion Number. The method further comprises in the portable communication unit the steps of establishing a communication link with the base station in response to said receiving step, and transmitting thereafter the Call-Completion Number and a Call-Type Code in accordance with the received Call-Type Identifier. The method further comprises in the base station the steps of originating a call to the telephone system in accordance with the Call-Completion Number and the Call-Type Code received from the portable communication unit during said transmitting step, and completing thereafter processing of the inbound call in a manner determined by the Call-Type Code.

Another aspect of the present invention comprises a portable communication unit for completing an inbound call from a telephone system to a user of the portable communication unit in a communication system. The communication system comprises a base station coupled to the telephone system. The telephone system is capable of completing the inbound call by a plurality of procedures requiring a plurality of differing responses by the base station and the portable communication unit. The portable communication unit comprises a receiver for receiving a selective call message including a Call-Type Identifier and a Call-Completion Number. The portable communication unit further comprises a memory coupled to the receiver for storing the received selective call message, and a processor coupled to the memory for controlling storage and retrieval of the received selective call message. The portable communication unit further comprises user controls coupled to the processor for directing operation of the portable communication unit, and a transceiver coupled to the processor for establishing a communication link with the base station and for transmitting thereafter the Call-Completion Number and a Call-Type Code in accordance with the received Call-Type Identifier.

Another aspect of the present invention comprises a base station for completing an inbound call from a telephone system to a user of a portable communication unit in a communication system. The base station is coupled to the telephone system by a telephone line, and the telephone system is capable of completing the inbound call by a plurality of procedures requiring a plurality of differing responses by the base station and the portable communication unit. The base station comprises a transceiver for establishing communications with the portable communication unit, and a processor coupled to the transceiver for controlling the transceiver. The base station further comprises a telephone interface coupled to the processor for interfacing the base station with the telephone line, and a call originator element coupled to the processor for originating a call to the telephone system in accordance with a Call-Completion Number and a Call-Type Code received from the portable communication unit, and for completing thereafter processing of the inbound call in a manner determined by the Call-Type Code.

DESCRIPTION OF THE PREFERRED EMBODIMENT

Figure 1:
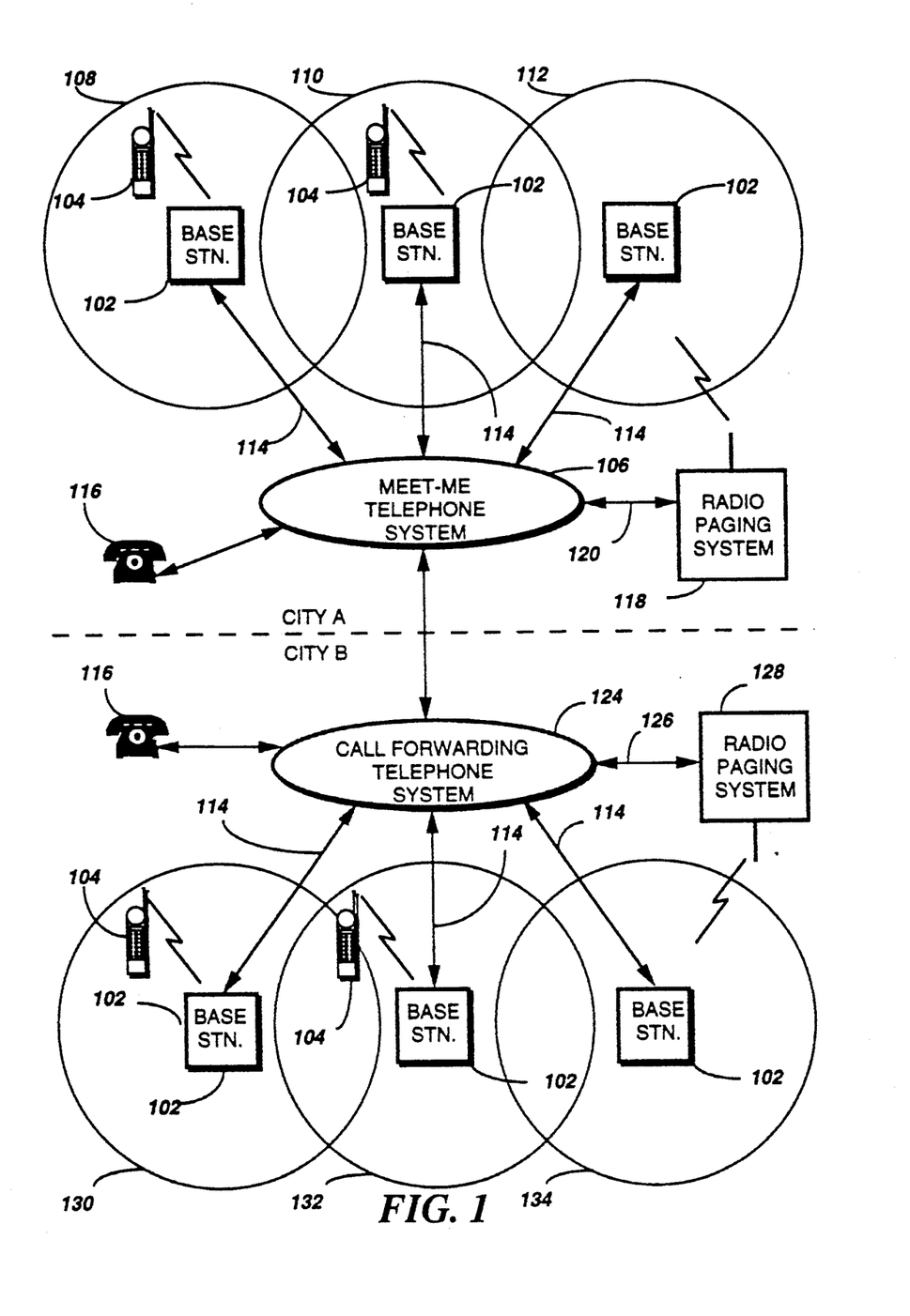
FIG. 1 is an electrical block diagram of a communication system compatible with two types of inbound calling procedures in accordance with the preferred embodiment of the present invention.

Referring to FIG. 1, an electrical block diagram of a communication system compatible with two types of inbound calling procedures in accordance with the preferred embodiment of the present invention comprises base stations 102 for radio coupling to portable communication units 104. The base stations 102 provide communications such as within radio coverage areas 108, 110, 112 in City A and radio coverage areas 130, 132, 134 in City B. The base stations 102 are also coupled by telephone lines 114 to telephone systems 106 and 124 in City A and City B, respectively.

The telephone system 106 of City A is capable of completing an inbound call from a telephone set 116 to one of the portable communication units 104 using the "Meet-Me" procedure described briefly in the "Background of the Invention" herein above. The telephone system 124 of City B is capable of completing an inbound call from the telephone set 116 to one of the portable communication units 104 using the "Call-Forwarding" procedure also described briefly in the "Background of the Invention" herein above. The telephone systems 106, 124 are coupled to radio paging systems 118, 128 by lines 120, 126, respectively, for controlling the radio paging systems 118, 128 to send a selective call message.

The selective call message has a predetermined message structure (defined herein below in reference to FIG. 4), and is sent to a selective call receiver coupled to one of the portable communication units 104 in response to one of the telephone systems 106, 124 receiving an inbound call for the portable communication unit 104. The radio paging systems 118, 128 are well known to one of ordinary skill in the art and preferably comprise a paging controller having at least numeric message capability, e.g., the model E09PED0552 paging terminal manufactured by Motorola, Inc. of Schaumburg, Ill., and one or more conventional digital radio paging transmitters. The base stations 102 and the portable communication units 104 advantageously are capable of automatically adapting their operation to both the Meet-Me procedure and the Call-Forwarding procedure for handling inbound calls to the portable communication unit in accordance with the preferred embodiment of the present invention, as described herein below.

Figure 2:
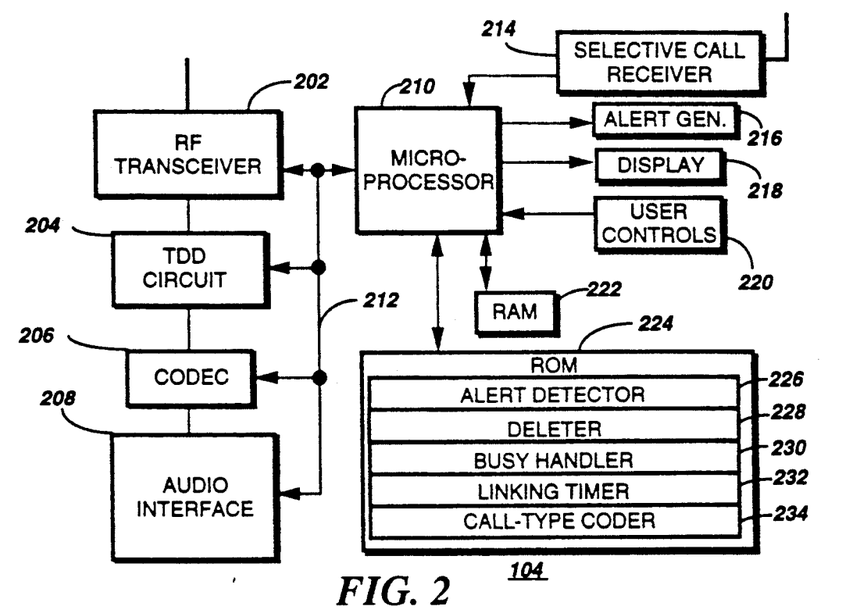
FIG. 2 is an electrical block diagram of a portable communication unit in accordance with the preferred embodiment of the present invention.

Referring to FIG. 2, an electrical block diagram of the portable communication unit 104 in accordance with the preferred embodiment of the present invention comprises an RF transceiver 202 for establishing communications with the base station 102. The RF transceiver 202 is coupled to a time-division-duplex (TDD) circuit 204, a CODEC 206, and an audio interface 208 for converting transceived RF signals to and from user audio. The RF transceiver 202, the TDD circuit 204, the CODEC 206, and the audio interface 208 are conventional such as may be found in the model S35XCD1000AA portable communication unit manufactured by Motorola, Inc. of Schaumburg, Ill. The RF transceiver 202, the TDD circuit 204, the CODEC 206, and the audio interface 208 are coupled to a microprocessor 210 by a bus 212 for controlling operation of the RF transceiver 202, the TDD circuit 204, the CODEC 206, and the audio interface 208. Preferably the microprocessor 210 is one of the MC68HC05C8 or C11 series microcomputers manufactured by Motorola, Inc. of Schaumburg, Ill. It will be appreciated that other similar microcomputers may be used as well for the microprocessor 210.

A selective call receiver 214 is coupled to the microprocessor 210 for receiving selective call messages and for passing the received messages thereto. The selective call receiver 214 is a conventional selective call receiver capable of receiving at least a numeric message and of transferring the received numeric message to an external device. An example is the NewsStream ™ Advanced Information Receiver manufactured by Motorola, Inc. of Schaumburg, Ill. It will be appreciated that the circuitry of the selective call receiver 214 may be incorporated into a common housing for the portable communication unit 104.

An alert generator 216 is coupled to the microprocessor 210 for generating an audible or tactile alert under control of the microprocessor 210. A display 218 is coupled to the microprocessor 210 for displaying information sent from the microprocessor 210. User controls 220 are also coupled to the microprocessor 210 for allowing a user to control operation of the portable communication unit 104. A random access memory (RAM) 222 is also coupled to the microprocessor 210 for storing information received in the selective call messages. A read-only memory (ROM) 224 is also coupled to the microprocessor 210 for storing control firmware. It will be appreciated that the RAM 222 and the ROM 224 may be included as integral components of the microprocessor 210 as well.

The ROM 224 includes firmware processor elements for controlling the microprocessor 210 in response to the information received in the selective call messages in accordance with the preferred embodiment of the present invention, comprising an Alert Detector routine 226. The Alert Detector routine 226 detects an ALERT message from the base station 102 and returns thereafter an ANSWER message in response to the user's executing a predetermined ANSWER sequence on the user controls 220 before a time period following the receipt of the selective call message exceeds a time-out value. Alternatively the Alert Detector routine 226 returns after the ALERT message an ABORT message in response to the user's failing to execute the predetermined ANSWER sequence on the user controls 220 before the time period following the receipt of the selective call message exceeds the time-out value.

The ROM 224 further comprises a Deleter routine 228 for deleting a Call-Completion Number from the memory in response to completing an inbound call and also in response to aborting further processing of the inbound call. The ROM 224 further comprises a Busy Handler routine 230 for determining whether the portable communication unit 104 is busy handling another call when the selective call message is received, and further for abbreviating inbound call processing in response to determining that the portable communication unit 104 is busy. The ROM 224 also comprises a Linking Timer routine 232 for making an attempt to establish a communication link, and for timing the duration of the attempt, and further for ending the attempt in response to failing to establish the communication link within a predetermined time. The ROM 224 further includes a Call-Type Coder routine 234 for converting a numeric call-type digit received in the selective call message into a preferably non-numeric Call-Type Code for transmission to the base station 102 as described herein below. It will be appreciated that, while firmware routines are described such as for the Alert Detector routine 226, hardware circuits or elements can be implemented as well to perform the functions described.

Figure 3:
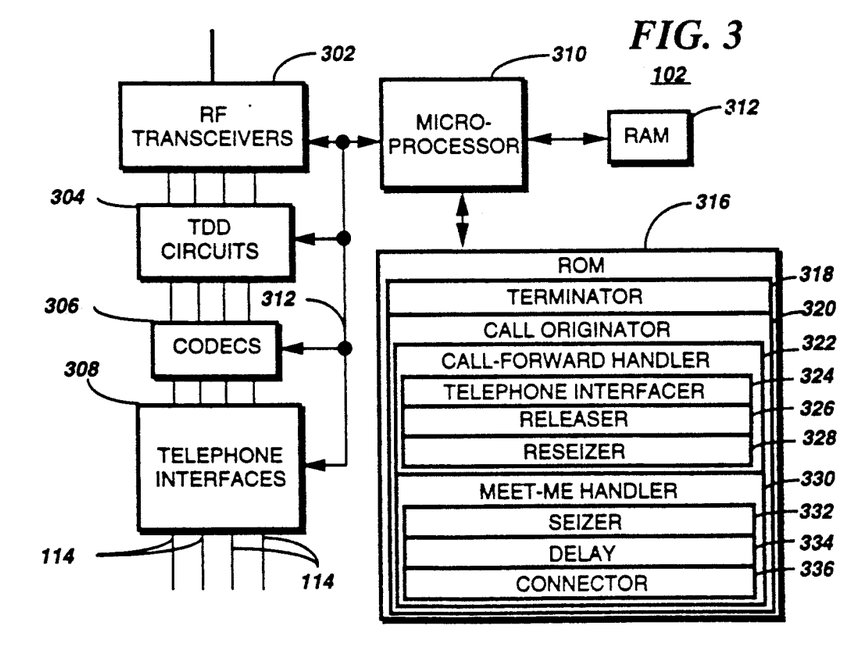
FIG. 3 is an electrical block diagram of a base station in accordance with the preferred embodiment of the present invention.

Referring to FIG. 3, an electrical block diagram of the base station 102 in accordance with the preferred embodiment of the present invention comprises RF transceivers 302 for establishing communications with the portable communication units 104. The RF transceivers 302 are coupled to time-division-duplex (TDD) circuits 304, CODECs 306, and telephone interfaces 308 for converting transceived RF signals to and from telephone communications, which are coupled to the telephone systems 106, 124 by the telephone lines 114. The RF transceivers 302, the TDD circuits 304, the CODECs 306, and the telephone interfaces 308 are conventional and can be found in the model S35XGB1602AP base station manufactured by Motorola, Inc. of Schaumburg, Ill. The RF transceivers 302, the TDD circuits 304, the CODECs 306, and the telephone interfaces 308 are coupled to a microprocessor 310 by a bus 312 for controlling operation of the RF transceivers 302, the TDD circuits 304, the CODECs 306, and the telephone interfaces 308.

The microprocessor 310 is also coupled to a RAM 312 for storing information received from the portable communication unit 104 during communications with the portable communication unit 104. The microprocessor 310 is further coupled to a ROM 316 for storing control firmware. It will be appreciated that the RAM 312 and the ROM 316 may be included as integral components of the microprocessor 310 as well.

The ROM 316 includes firmware processor elements for controlling the microprocessor 310 in response to the information received the portable communication unit 104 in accordance with the preferred embodiment of the present invention, comprising a Terminator routine 318. The Terminator routine 318 controls the transceiver to terminate communications with the portable communication unit 104 and aborts further processing of an inbound call in response to receiving an ABORT message from the portable communication unit 104.

The ROM 316 also includes a Call Originator routine 320 for originating a call to one of the telephone systems 106, 124 in accordance with the Call-Completion Number and the Call-Type Code received from the portable communication unit 104, and for completing thereafter processing of the inbound call in a manner determined by the Call-Type Code. The Call Originator routine 320 comprises a Call-Forward Handler routine 322 for processing an inbound call in response to the Call-Type Code being the Call-Forward type.

The Call-Forward Handler routine 322 comprises a Telephone Interfacer routine 324 for controlling one of the telephone interfaces 308 to seize a telephone line 114 and to dial a predetermined "feature code" plus the Call-Completion Number over the telephone line 114. The Call-Forward Handler routine 322 further comprises a Releaser routine 326 for releasing the seized telephone line 114 after completing dialing and for reserving the released telephone line 114 for a call-back from the telephone system 124, and further for controlling the RF transceiver 302 to send an ALERT message to the portable communication unit 104 in response to an incoming call appearing on the reserved telephone line 114. The Call-Forward Handler routine 322 also includes a Reseizer routine 328 for getting an ANSWER message from the portable communication unit 104 in response to the ALERT message, and for reseizing the reserved telephone line 114 in response thereto, and further for enabling communications between the telephone line 114 and the portable communication unit 104 after reseizing the telephone line 114.

The Call Originator routine 320 further comprises a Meet-Me Handler routine 330 for processing an inbound call in response to the Call-Type Code being the Meet-Me type. The Meet-Me Handler routine 330 comprises a Seizer routine 332 for controlling one of the telephone interfaces 308 to seize a telephone line 114 and to dial the Call-Completion Number over the telephone line 114. The Meet-Me Handler routine 330 further comprises a Delay routine 334 for waiting for answer supervision on the telephone line 114 after completing dialing, and for controlling the RF transceiver 302 to send an ALERT message to the portable communication unit 104 in response to getting the answer supervision. The Meet-Me Handler routine 330 also includes a Connector routine 336 for getting an ANSWER message from the portable communication unit 104 in response to the ALERT message, and for sending a CONNECT code to the telephone system 106 in response thereto, and further for enabling communications between the telephone line 114 and the portable communication unit 104 after sending the CONNECT code. It will be appreciated that, while firmware routines are described such as for the Terminator routine 318, hardware circuits or elements can be implemented as well to perform the functions described.

Figure 4:
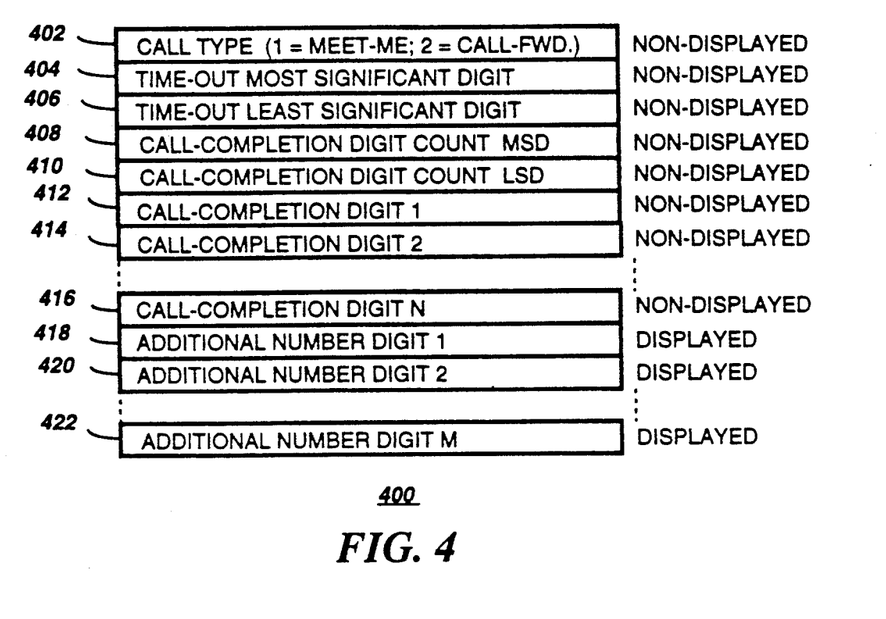
FIG. 4 is a diagram of information elements sent to the portable communication unit in a selective call message in accordance with the preferred embodiment of the present invention.

Referring to FIG. 4, a diagram of information elements 400 transmitted to the portable communication unit 104 in a selective call message originated by one of the telephone systems 106, 124 in accordance with the preferred embodiment of the present invention comprises a Call-Type digit 402 for defining what type of inbound calling procedure is being used by the one of the telephone systems 106, 124, e.g., the digit 1 for Meet-Me and the digit 2 for Call-Forwarding. The Call-Type digit 402 advantageously can accommodate up to eight additional values (3–9 and 0), thus providing expansion capability for future types of calls.

The information elements 400 further comprise first and second time-out digits 404, 406 for specifying a time-out value, e.g., thirty seconds, to coordinate a time-out used by the portable communication unit 104 with a time-out used by one of the telephone systems 106, 124. Time-out coordination is advantageous because the telephone systems 106, 124 reserve common resources for a specific time period for connecting an inbound call and then may reuse the common resources for a different incoming call. If the portable communication unit 104 originates a call to a "stale", i.e., timed-out, Call-Completion Number, the portable communication unit 104 may be misconnected to an inbound call intended for a different portable communication unit 104. The coordinated time-outs provided by the preferred embodiment of the present invention advantageously minimize the potential misconnection problem.

The information elements 400 further comprise first and second Call-Completion Digit Count digits 408, 410, representing a value N, e.g., one to ninety-nine, for specifying to the portable communication unit 104 how many digits are included in the Call-Completion Number. These digits are followed by the N Call-Completion Number digits 412, 414, 416. The next information elements 400 comprise M (any amount) Additional Number digits 418, 420, 422, e.g., digits for identifying a calling party who originated the inbound call.

The information elements 400 advantageously enable the portable communication unit 104 and the base station 102 to adapt to a variety of inbound calling procedures and time-out values in a manner transparent to the user. Except for the limit of ninety-nine Call-Completion Number digits, there are substantially no constraints on the number of or meaning of the Call-Completion Number digits 412, 414, 416 or on the number of or meaning of the Additional Number digits 418, 420, 244. This flexibility is valuable in that it allows the portable communication unit 104 and the base station 102 to operate compatibly with a variety of telephone systems using differing procedures for inbound calling, such as the telephone systems 106, 124, without requiring any modification to the portable communication unit 104 or the base station 102 to achieve the compatible operation.

Figure 5:
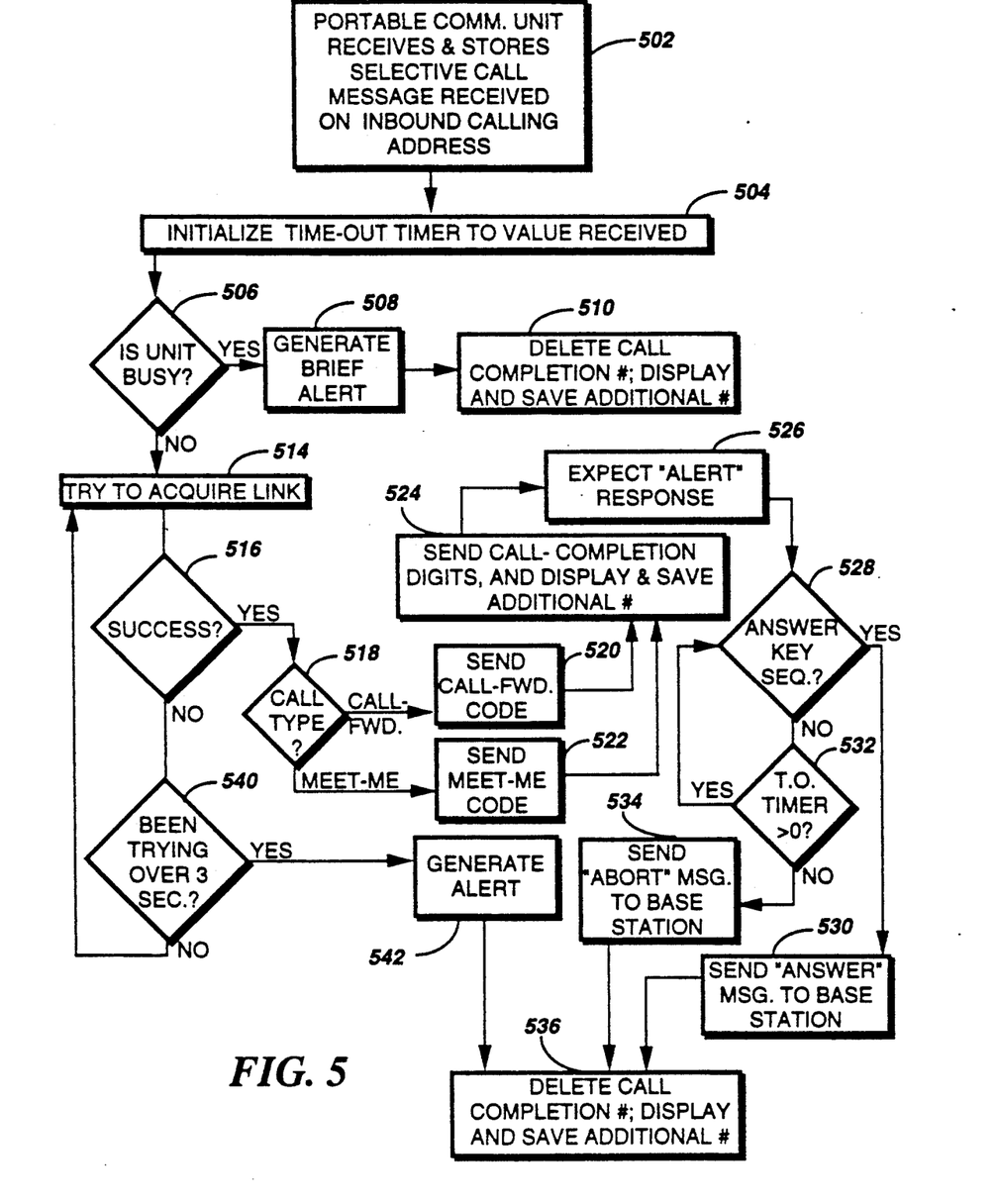
FIG. 5 is a flow chart of the operation of the portable communication unit in accordance with the preferred embodiment of the present invention.

Referring to FIG. 5, a flow chart of the operation of the portable communication unit in accordance with the preferred embodiment of the present invention begins with the portable communication unit 104 receiving and storing 502 a selective call message received on an address preferably used exclusively for inbound calls. In response, the microprocessor 210 of the portable communication unit 104 initializes 504 a software time-out timer by storing in the RAM 222 the first and second time-out digits 404, 406 received in the information elements 400 of the selective call message. Next, the microprocessor 210 accesses the Busy Handler routine 230 to determine 506 whether the portable communication unit 104 is busy handling an earlier call. If in step 506 the portable communication unit 104 is busy, the microprocessor 210 directs the alert generator 216 to generate a brief alert to inform the user that an inbound call has been received.

Next, the microprocessor 210 preferably accesses the Deleter routine 228 and deletes 510 the received Call-Completion Number digits 412, 414, 416, while saving and displaying for possible later call-back the Additional Number digits 418, 420, 422, e.g., digits identifying the calling party. This is done because the common resources of the telephone system 106, 124 associated with the Call-Completion Number digits can be reassigned to a different inbound call before the earlier call ends. It will be appreciated that an alternative approach would be to delay deletion of the Call-Completion Number digits 412, 414, 416 for a time-out period associated with the software time-out timer to allow the user to end the earlier call and answer the new incoming call.

If, on the other hand, in step 506 the portable communication unit 104 is not busy, the microprocessor 210 controls the RF transceiver 202 to attempt 514 to acquire a communication link with one of the base stations 102. If in step 516 the link attempt has not yet succeeded, the microprocessor 210 then accesses the Linking Timer routine 232 and checks 540 whether the link attempt has been in progress for longer than a predetermined time, e.g., three seconds. If not, the microprocessor 210 loops back to step 514 and continues the link attempt. If, on the other hand, in step 540 the microprocessor 210 determines that the link attempt has been in progress for longer than the predetermined time, then the microprocessor 210 controls 542 the alert generator 216 to generate an alert. Then the microprocessor 210 deletes 536 the Call-Completion Number digits 412, 414, 416, while displaying and saving the Additional Number digits so that the user can attempt to call the caller back later.

If, on the other hand, in step 516 the link attempt succeeds, the microprocessor 210 then evaluates 518 the received Call-Type digit 402 to determine the call type. If the call type is Call-Forward, the microprocessor 210 accesses the Call-Type Coder routine 234 to determine the Call-Forward Code, and the microprocessor 210 then controls 520 the RF transceiver 202 to send the Call-Forward Code to the base station 102. If in step 518 the call type is Meet-Me, the microprocessor 210 accesses the Call-Type Coder routine 234 to determine the Meet-Me Code, and the microprocessor 210 then controls 522 the RF transceiver 202 to send the Meet-Me Code to the base station 102.

Next, the microprocessor 210 controls 524 the RF transceiver 202 to send the received Call-Completion Number digits 412, 414, 416 to the base station 102, and saves in the RAM 222 and displays on the display 218 the received Additional Number digits 418, 420, 422. At this point the microprocessor 210 expects 526 a response in the form of an "Alert" message from the base station 102 and accesses the Alert Detector routine 226.

In step 528 the microprocessor 210 checks whether the user has responded to the expected alert by executing a key sequence indicating a desire to answer the inbound call. If not, the microprocessor 210 checks 532 whether the software time-out timer has expired. If not, the microprocessor 210 continues to loop between steps 528 and 532 until detecting either the answer key sequence or the expiration of the time-out timer, whichever occurs first. If in step 528 the answer key sequence is detected first, the microprocessor 210 controls the RF transceiver 202 to send 530 an "Answer" message to the base station 102, after which the microprocessor 210 deletes 536 the Call-Completion Number digits 412, 414, 416, while displaying and saving the Additional Number digits 418, 420, 422.

If, on the other hand, in step 532 the time-out timer expires first, then the microprocessor 210 controls the RF transceiver 202 to send 534 an "Abort" message to the base station 102, after which the microprocessor 210 deletes 536 the Call-Completion Number digits 412, 414, 416, while displaying and saving the Additional Number digits 418, 420, 422 so that the user can call the caller back later.

Because the portable communication unit 104 is the recipient of the selective call message first announcing the inbound call to the RF communication system, it would be possible to alert the user immediately upon receipt of the selective call message. The procedure described in FIG. 5 does not alert the user that an inbound call has been received until AFTER the RF link has been established with the base station 102 and the base station 102 has responded with an "Alert" message to indicate that the caller is connected and ready to communicate. In this manner the portable communication unit 104 advantageously avoids misleading the user into attempting to answer an inbound call before a connection has been completed to the caller.

Figure 6:
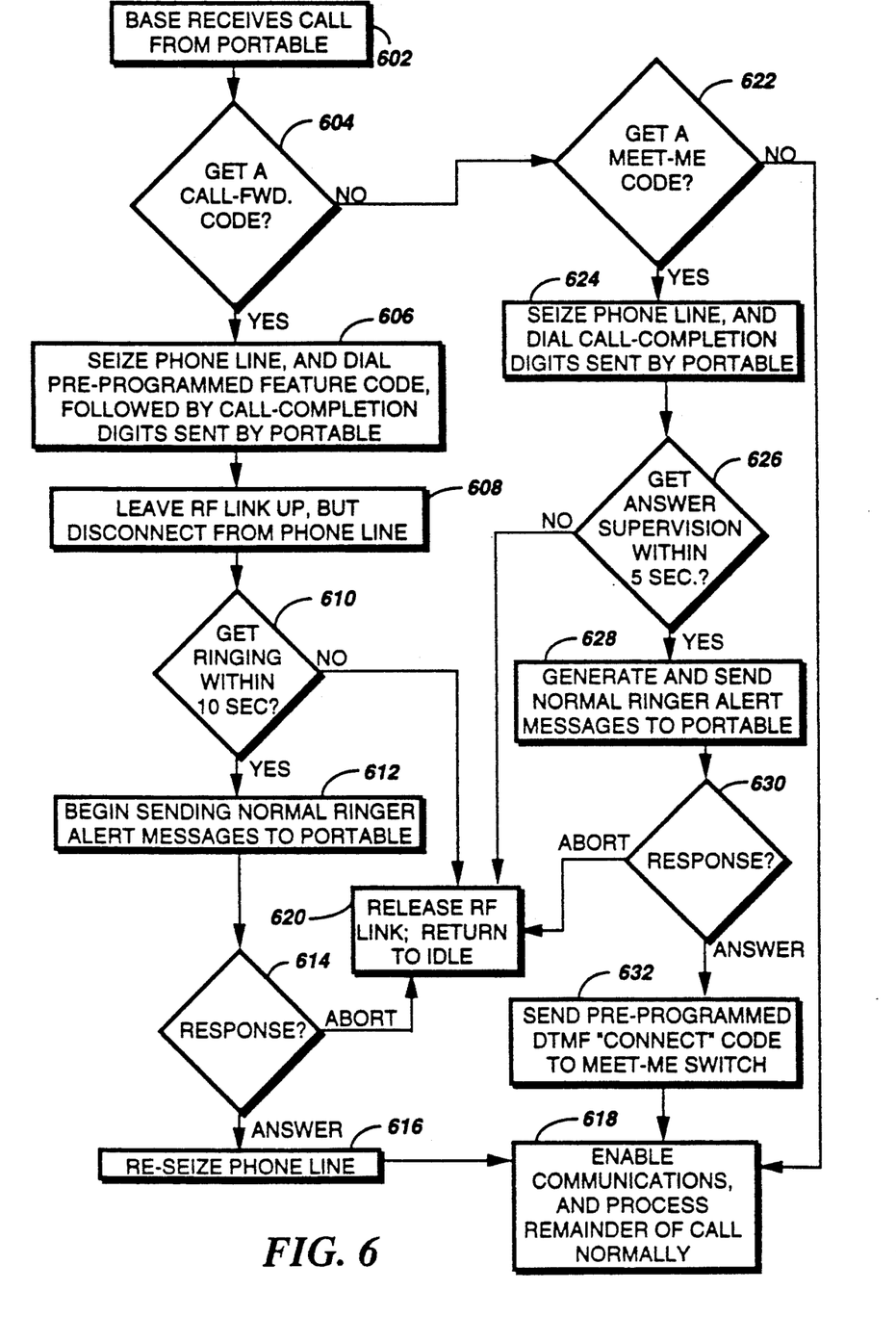
FIG. 6 is a flow chart of the operation of the base station in accordance with the preferred embodiment of the present invention.

Referring to FIG. 6, a flow chart of the operation of the base station 102 in accordance with the preferred embodiment of the present invention begins with the base station 102 receiving 602 a call from the portable communication unit 104 on an RF link. In response, the microprocessor 310 of the base station 102 accesses the Call Originator routine 320 and checks 604 whether the portable communication unit 104 has sent the Call-Forward Code. If so, the microprocessor 310 accesses the Telephone Interfacer routine 324 of the Call-Forward Handler routine 322 to control one of the telephone interfaces 308 to seize 606 a telephone line 114 and dial a pre-programmed feature code to activate the Call-Forwarding feature of the telephone system 124.

The feature code is followed by the received Call-Completion Number digits identifying the call to be forwarded. After sending the Call-Completion Number digits, the microprocessor 310 maintains 608 the RF link with the portable communication unit 104 and accesses the Releaser routine 326 to disconnect from, but reserve, the telephone line 114. Next the microprocessor 310 checks 610 to determine whether the telephone interface 308 of the reserved telephone line 114 has detected ringing voltage thereon indicating an incoming call. If ringing voltage is not detected within a predetermined time, e.g., ten seconds, the microprocessor 310 accesses the Terminator routine 318 to release 620 the RF link and return to an idle status.

If, on the other hand, ringing voltage is detected at step 610 within the predetermined time, the microprocessor 310 begins controlling the RF transceiver 302 to send 612 normal ringer alert messages to the portable communication unit 104. The microprocessor 310 then monitors the RF transceiver 302 for a response from the portable communication unit 104. If in step 614 the response is "Abort", the microprocessor 310 then accesses the Terminator routine 318 to release 620 the RF link and return to an idle status. If, instead, in step 614 the response is "Answer", the microprocessor 310 then accesses the Reseizer routine 328 to control the telephone interface 308 to reseize 616 the reserved telephone line 114. Then the microprocessor 310 enables 618 communications between the telephone line 114 and the portable communication unit 104, and processes the remainder of the call in the well-known manner for processing an established call between the portable communication unit 104 and the telephone system 124.

If, on the other hand, in step 604 the microprocessor 310 determines that the portable communication unit 104 has not sent the Call-Forward Code, then the microprocessor 310 checks 622 whether the portable communication unit 104 has sent the Meet-Me Code. If not, the microprocessor 310 enables 618 communications between the telephone line 114 and the portable communication unit 104, and processes the call in the well-known manner for processing an outbound call from the portable communication unit 104 to the telephone system 106, 124.

If, instead, in step 622 the microprocessor 310 determines that the portable communication unit 104 has sent the Meet-Me Code, then the microprocessor 310 accesses the Seizer routine 332 of the Meet-Me Handler routine 330 to control one of the telephone interfaces 308 to seize 624 a telephone line 114 and to dial the Call-Completion Number digits 412, 414, 416 received from the portable communication unit 104. Next the microprocessor 310 accesses the Delay routine 334, and if in step 626 answer supervision is not returned from the telephone system 106 and detected by the telephone interface 308 within a predetermined time, e.g., five seconds, then the microprocessor 310 accesses the Terminator routine 318 to release 620 the RF link and return to an idle status.

If, on the other hand, in step 626 answer supervision is returned from the telephone system 106 and detected by the telephone interface 308 within the predetermined time, then the microprocessor 310 controls the RF transceiver 302 to send 628 normal ringer alert messages to the portable communication unit 104. The microprocessor 310 then monitors the RF transceiver 302 for a response from the portable communication unit 104. If in step 630 the response is "Abort", the microprocessor 310 then accesses the Terminator routine 318 to release 620 the RF link and return to an idle status. If, instead, in step 630 the response is "Answer", the microprocessor 310 then accesses the Connector routine 336 to control the telephone interface 308 to send 632 a pre-programmed "Connect" code, e.g., a dual-tone multi-frequency (DTMF) signal, to the telephone system 106. The purpose of the "Connect" code is to positively inform the telephone system 106 that the user has answered the inbound call so that the telephone system 106 may now bill for the call, if billing is applicable. Then the microprocessor 310 enables 618 communications between the telephone line 114 and the portable communication unit 104, and processes the remainder of the call in the well-known manner for processing an established call between the portable communication unit 104 and the telephone system 124.

Thus, as described above, the preferred embodiment of the present invention provides a method and apparatus for overcoming the need for unique construction of the base station 102 and the portable communication unit 104 for compatibility with different inbound calling procedures. The method and apparatus advantageously allow the base station 102 and the portable communication unit 104 to adapt automatically to different types of inbound calling procedures in response to an instructional message received by the portable communication unit 104 from the telephone systems 106, 124 through a radio paging system. System variables, such as common resource time-outs and the need for answer supervision for billing, also are accommodated. The message format used is readily adaptable to modifications and additions to accommodate new inbound calling procedures that may be developed in the future.

What is claimed is:

1. A method for completing an inbound call from a telephone system to a user of a portable communication unit including user controls operating in a communication system comprising a base station coupled to the telephone system by a telephone line, wherein the telephone system is capable of completing the inbound call by a plurality of procedures requiring a plurality of differing responses by the base station and the portable communication unit, the method comprising in the portable communication unit the steps of:
receiving a selective call message comprising a Call-Type Identifier and a Call-Completion Number;
establishing a communication link with the base station in response to said receiving step; and
transmitting thereafter the Call-Completion Number and a Call-Type Code in accordance with the received Call-Type Identifier,
wherein the method further comprises in the base station the steps of:
originating a call to the telephone system in accordance with the Call-Completion Number and the Call-Type Code received from the portable communication unit during said transmitting step; and
completing thereafter processing of the inbound call in a manner determined by the Call-Type Code.

2. The method of claim 1,
wherein the selective call message further comprises a time-out value, and
wherein the method further comprises in the portable communication unit the steps of:
detecting an ALERT message from the base station;
returning after the detecting step an ANSWER message in response to the user's executing a predetermined ANSWER sequence on the user controls before a time period following the receipt of the selective call message exceeds the time-out value; and
returning after the detecting step an ABORT message in response to the user's failing to execute the predetermined ANSWER sequence on the user controls before the time period following the receipt of the selective call message exceeds the time-out value, and
wherein the method further comprises in the base station the step of:
aborting further processing of the inbound call in response to receiving the ABORT message.

3. The method of claim 1,
wherein said receiving step further comprises the steps of:
determining whether the portable communication unit is busy handling another call when the selective call message is received; and
abbreviating inbound call processing in response to determining in said determining step that the portable communication unit is busy, the abbreviated processing comprising the steps of:
generating an alert; and
aborting further processing of the inbound call.

4. The method of claim 1,
wherein said establishing step comprises the steps of:
attempting to establish the communication link;
timing said attempting step;
ending said attempting step in response to failing to establish the communication link within a predetermined time, the ending step comprising the steps of:
generating an alert; and
aborting further processing of the inbound call.

5. The method of claim 1,
wherein the portable communication unit further includes a memory, and
wherein the method further comprises the step of:
storing the received selective call message in the memory.

6. The method of claim 5,
wherein the portable communication unit comprises a display, and
wherein the selective call message further comprises:
a digit count preceding the Call-Completion Number for indicating where the Call-Completion Number ends; and
an additional number following the indicated end of the call completion number, and
wherein the method further comprises in the portable communication unit the steps of:
deleting the Call-Completion Number from the memory in response to completing the inbound call and also in response to aborting further processing of the inbound call; and
displaying the additional number on the display in response to successfully completing the inbound call and also in response to aborting further processing of the inbound call.

7. The method of claim 6,
wherein said transmitting step comprises the step of displaying the additional number on the display.

8. The method of claim 1,
wherein the Call-Type Code is a selected one of a plurality of call-types, and
wherein the plurality of call-types comprise a Call-Forward type, and
wherein said originating step, in response to the Call-Type Code being the Call-Forward type, comprises the steps of:
seizing the telephone line;
dialing a predetermined telephone feature code plus the Call-Completion Number over the seized telephone line, and
wherein said completing step, in response to the Call-Type Code being the Call-Forward type, comprises the steps of:
releasing the seized telephone line after said dialing step;
reserving the released telephone line for a call-back from the telephone system;
issuing an ALERT message to the portable communication unit in response to an incoming call appearing on the reserved telephone line;
getting a message from the portable communication unit in response to said issuing step;

reseizing the reserved telephone line in response to getting an ANSWER message in said getting step; and enabling communications between the telephone line and the portable communication unit after said reseizing step.

9. The method of claim 8, wherein said getting step, in response to getting an ABORT message, comprises the steps of:

releasing the communication link established between the portable communication unit and the base station during said establishing step; and aborting further processing of the inbound call.

10. The method of claim 1, wherein the Call-Type Code is a selected one of a plurality of call-types, and wherein the plurality of call-types comprise a Meet-Me type, and wherein said originating step, in response to the Call-Type Code being the Meet-Me type, comprises the steps of:

seizing the telephone line;

dialing the Call-Completion Number over the seized telephone line, and wherein said completing step, in response to the Call-Type Code being the Meet-Me type, comprises the steps of:

waiting for answer supervision from the telephone system in response to said dialing step;

issuing an ALERT message to the portable communication unit in response to the answer supervision;

getting a message from the portable communication unit in response to said alerting step;

sending a CONNECT code to the telephone system in response to getting an ANSWER message in said getting step; and enabling communications between the telephone line and the portable communication unit after said sending step.

11. The method of claim 10, wherein said getting step, in response to getting an ABORT message, comprises the steps of:

releasing the communication link established between the portable communication unit and the base station in said establishing step; and aborting further processing of the inbound call.

12. A portable communication unit for completing an inbound call from a telephone system to a user of the portable communication unit in a communication system comprising a base station coupled to the telephone system, wherein the telephone system is capable of completing the inbound call by a plurality of procedures requiring a plurality of differing responses by the base station and the portable communication unit, the portable communication unit comprising:

a receiver for receiving a selective call message comprising a Call-Type Identifier and a Call-Completion Number;

a memory coupled to the receiver for storing the received selective call message;

a processor coupled to the memory for controlling storage and retrieval of the received selective call message;

user controls coupled to the processor for directing operation of the portable communication unit;

a transceiver coupled to the processor for establishing a communication link with the base station and for transmitting thereafter the Call-Completion Number and a Call-Type Code in accordance with the received Call-Type Identifier.

13. The portable communication unit of claim 12, wherein the selective call message further comprises a time-out value, and wherein the portable communication unit further comprises a Alert Detector element coupled to the processor for detecting an ALERT message from the base station and returning thereafter an ANSWER message in response to the user's executing a predetermined ANSWER sequence on the user controls before a time period following receipt of the selective call message exceeds the time-out value, and alternatively for returning after the ALERT message an ABORT message in response to the user's failing to execute the predetermined ANSWER sequence on the user controls before the time period following receipt of the selective call message exceeds the time-out value.

14. The portable communication unit of claim 12, wherein the selective call message further comprises:

a digit count preceding the Call-Completion Number for indicating where the Call-Completion Number ends; and an additional number following the indicated end of the call completion number, and wherein the portable communication unit further comprises:

a Deleter element coupled to the processor for deleting the Call-Completion Number from the memory in response to completing the inbound call and also in response to aborting further processing of the inbound call; and a display for displaying the additional number in response to successfully completing the inbound call and also in response to aborting further processing of the inbound call.

15. The portable communication unit of claim 12, further comprising a Busy Handler element coupled to the processor for determining whether the portable communication unit is busy handling another call when the selective call message is received, and further for abbreviating inbound call processing in response to determining that the portable communication unit is busy.

16. The portable communication unit of claim 12, further comprising a Linking Timer element coupled to the processor for making an attempt to establish the communication link, and for timing the duration of the attempt, and further for ending the attempt in response to failing to establish the communication link within a predetermined time.

17. A base station for completing an inbound call from a telephone system to a user of a portable communication unit in a communication system, wherein the base station is coupled to the telephone system by a telephone line, and wherein the telephone system is capable of completing the inbound call by a plurality of procedures requiring a plurality of differing responses by the base station and the portable communication unit, the base station comprising:

a transceiver for establishing communications with the portable communication unit;

a processor coupled to the transceiver for controlling the transceiver;

a telephone interface coupled to the processor for interfacing the base station with the telephone line; and a Call Originator element coupled to the processor for originating a call to the telephone system in accordance with a Call-Completion Number and a Call-Type Code received from the portable communication unit, and for completing thereafter processing of the inbound call in a manner determined by the Call-Type Code.

18. The base station of claim 17, further comprising a Terminator element coupled to the processor for controlling the transceiver to terminate communications with the portable communication unit and for aborting further processing of the inbound call in response to receiving an ABORT message from the portable communication unit.

19. The base station of claim 17,
wherein the Call-Type Code is a selected one of a plurality of call-types, and
wherein the plurality of call-types comprise a Call-Forward type, and
wherein the Call Originator comprises a Call-Forward Handler element coupled to the processor for processing the inbound call in response to the Call-Type Code being the Call-Forward type, the Call-Forward Handler element comprising:
  a Telephone Interfacer element for controlling the telephone interface to seize the telephone line and to dial a predetermined telephone feature code plus the Call-Completion Number over the telephone line;
  a Releaser element coupled to the Telephone Interfacer element for releasing the seized telephone line after completing dialing and for reserving the released telephone line for a call-back from the telephone system, and further for controlling the transceiver to send an ALERT message to the portable communication unit in response to an incoming call appearing on the reserved telephone line; and
  a Reseizer element coupled to the Releaser element for getting an ANSWER message from the portable communication unit in response to the ALERT message, and for reseizing the reserved telephone line in response thereto, and further for enabling communications between the telephone line and the portable communication unit after reseizing the telephone line.

20. The base station of claim 17,
wherein the Call-Type Code is a selected one of a plurality of call-types, and
wherein the plurality of call-types comprise a Meet-Me type, and
wherein the Call Originator comprises a Meet-Me Handler element coupled to the processor for processing the inbound call in response to the Call-Type Code being the Meet-Me type, the Meet-Me Handler element comprising:
  an Seizer element for controlling the telephone interface to seize the telephone line and to dial the Call-Completion Number over the telephone line;
  a Delay element coupled to the Seizer element for waiting for answer supervision on the telephone line after completing dialing and for controlling the transceiver to send an ALERT message to the portable communication unit in response to getting the answer supervision; and
  a Connector element coupled to the Delay element for getting an ANSWER message from the portable communication unit in response to the ALERT message, and for sending a CONNECT code to the telephone system in response thereto, and further for enabling communications between the telephone line and the portable communication unit after sending the CONNECT code.

* * * * *